United States Patent
Ault et al.

(10) Patent No.: US 9,585,366 B2
(45) Date of Patent: Mar. 7, 2017

(54) HOUSEBREAKING REWARD SYSTEM

(71) Applicant: Radio Systems Corporation, Knoxville, TN (US)

(72) Inventors: Patti A. Ault, Knoxville, TN (US);
Myra Loveday, Knoxville, TN (US);
Ricky Dukes, Knoxville, TN (US);
Steven Schrick, Lenoir City, TN (US);
Jeffrey Brown, Knoxville, TN (US);
Matthew Strong, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 303 days.

(21) Appl. No.: 13/960,353

(22) Filed: Aug. 6, 2013

(65) Prior Publication Data
US 2014/0033989 A1    Feb. 6, 2014

Related U.S. Application Data

(60) Provisional application No. 61/680,250, filed on Aug. 6, 2012.

(51) Int. Cl.
*A01K 1/015*    (2006.01)
*A01K 15/02*    (2006.01)
*A01K 1/01*    (2006.01)

(52) U.S. Cl.
CPC ............ *A01K 15/02* (2013.01); *A01K 1/0107* (2013.01); *A01K 15/021* (2013.01)

(58) Field of Classification Search
CPC .... A01K 1/0157; A01K 5/0114; A01K 15/02; A01K 15/021; A01K 29/00; A01K 15/00; A01K 1/015

USPC .... 119/51.02, 712, 719, 718, 161, 163, 169, 119/171
See application file for complete search history.

(56) References Cited

U.S. PATENT DOCUMENTS 3,754,527 A    8/1973 Jenkins
4,507,121 A    3/1985 Leung
(Continued)

FOREIGN PATENT DOCUMENTS

GB    2192323 A  *  1/1988  ............. A01K 15/02

OTHER PUBLICATIONS

International Search Report and Written Opinion for PCT/US2013/053501 mailed Nov. 8, 2013.

*Primary Examiner* — Monica Williams
(74) *Attorney, Agent, or Firm* — Steven F. Owens; Merchant & Gould (57) ABSTRACT

A housebreaking reward system. The housebreaking reward system includes a moisture sensitive pad, a moisture detector, a reward dispenser, and an optional handheld transmitter. The moisture sensitive pad is constructed to contain and hold fluids (e.g., urine) deposited by an animal and is laid down at location where it is acceptable for an animal to eliminate. The moisture detector is selectively connectable to sensing elements on the moisture sensitive pad to detect when fluid is deposited. If fluid is detected, the moisture sensitive detector signals the reward dispenser to reward the animal for appropriate elimination. At least a portion the moisture sensitive pad is disposable to facilitate easy cleanup of the appropriate elimination area. After one or more fluid deposits, the moisture detector is disconnected from the sensing elements, and the used moisture sensitive pad is discarded.

19 Claims, 5 Drawing Sheets

(56) References Cited

U.S. PATENT DOCUMENTS

| | | | | |
|---|---|---|---|---|
| 4,796,014 | A * | 1/1989 | Chia | A44B 9/12 |
| | | | | 128/886 |
| 5,078,097 | A | 1/1992 | Chisholm | |
| 5,808,554 | A | 9/1998 | Shuminov | |
| 6,041,737 | A * | 3/2000 | Hennigan | A01K 1/0107 |
| | | | | 119/161 |
| 6,427,627 | B1 * | 8/2002 | Huisma | A01K 5/02 |
| | | | | 119/51.02 |
| 6,983,719 | B2 | 1/2006 | Armstrong | |
| 7,621,233 | B2 | 11/2009 | Dukes et al. | |
| 2001/0047768 | A1 * | 12/2001 | Markowitz | A01K 1/0107 |
| | | | | 119/165 |
| 2004/0050342 | A1 * | 3/2004 | Armstrong | A01K 5/02 |
| | | | | 119/707 |
| 2006/0011146 | A1 | 1/2006 | Kates | |
| 2008/0041792 | A1 * | 2/2008 | Crnkovich | A61F 13/42 |
| | | | | 210/739 |
| 2008/0072834 | A1 | 3/2008 | Makem | |
| 2008/0084316 | A1 * | 4/2008 | Panton | A01K 15/021 |
| | | | | 340/573.3 |
| 2008/0236504 | A1 * | 10/2008 | Silverman | A01K 1/0107 |
| | | | | 119/169 |
| 2009/0314223 | A1 * | 12/2009 | Yuu | A01K 15/02 |
| | | | | 119/720 |
| 2010/0064975 | A1 * | 3/2010 | McElroy, Jr. | A01K 1/0107 |
| | | | | 119/61.55 |
| 2014/0083364 | A1 * | 3/2014 | Anderson | A01K 5/01 |
| | | | | 119/51.01 |

* cited by examiner

HOUSEBREAKING REWARD SYSTEM

BACKGROUND

Eliminating at an undesired location (i.e., inappropriate elimination), typically indoors, is a common reason that pet owners get rid of pets. While not necessarily catastrophic, the consequences of inappropriate elimination include soiling and/or damage to floors, rugs, carpets, furniture, and other objects that requires expensive cleaning, repair, and/or replacement to rectify.

Housebreaking is a training technique, typically used with dogs, aimed at encouraging appropriate elimination by teaching the animal to consistently eliminate in a certain location. Housebreaking an animal can be a difficult and time consuming process requiring constant attention on the part of the pet owner. As with any training process, prompt and consistent reinforcement is an important factor in the speed and success of housebreaking an animal. If the reinforcement is not clearly linked in time to the behavior, the animal may not properly associate the reward with the behavior as intended by the pet owner. A common problem that occurs during housebreaking is that a pet owner lacks sufficient time to fully housebreak the animal before having to be away for extended periods (e.g., going to work). As a result, the animal being housebroken is unsupervised and appropriate elimination is not rewarded. This lack of prompt and consistent reinforcement frustrates and lengthens the training process.

Although frequently thought of as encouraging outdoor elimination, housebreaking is also used to train the animal to eliminate in a certain indoor location. Even when the indoor location is generally resilient to the soiling or damage from elimination (e.g., vinyl flooring), it is desirable to make cleanup as easy as possible and minimize contamination using tools such as disposable pads. Ideally, housebreaking teaches the animal to eliminate on the disposable pad. The soiled pad is then discarded without the need for additional cleanup. It is with respect to these and other considerations that the present invention has been made.

BRIEF SUMMARY

Various embodiments of the housebreaking reward system include a moisture sensitive pad, a moisture detector, and a reward dispenser. The moisture sensitive pad is constructed to contain and hold fluids (e.g., urine) deposited by an animal and is laid down at location where it is acceptable for an animal to eliminate. The moisture sensitive pad includes sensing elements used in conjunction with the moisture detector to detect when fluid is deposited on the moisture sensitive pad (i.e., when the animal urinates). The moisture detector is selectively connectable to the sensing elements and is communicatively linked to the reward dispenser. If fluid is detected, the moisture sensitive detector signals the reward dispenser to reward the animal for appropriate elimination. The moisture sensitive pad is disposable to facilitate easy cleanup of the appropriate elimination area. After one or more fluid deposits, the moisture detector is disconnected from the sensing elements, and the used moisture sensitive pad is discarded. For use during training, the housebreaking reward system optionally includes a handheld transmitter operable by a trainer.

The moisture sensitive pad includes sensing elements, an optional wicking layer, a fluid holding layer, and a backing layer. The sensing elements work with the moisture detector to detect moisture deposited on the moisture sensitive pad. The fluid holding layer includes one or more sorbent media layers that collect and hold fluids, such as urine. The wicking layer substantially dries after a time to allow the sensing elements to detect a subsequent elimination event. The backing layer is a fluid impermeable layer that prevents moisture in the fluid holding layer from being transferred to the floor or other surface supporting the moisture sensitive pad. At least a portion of the moisture sensitive pad is disposable.

To allow the detection of moisture, the sensing elements are placed in communication with the moisture detector. The sensing elements are generally arranged over a central portion of the moisture sensitive pad. Each of the sensing elements terminates at a connection point that electrically connects to a corresponding connection point on the moisture detector. The moisture sensitive pad has an alignment feature that registers with a cooperating alignment feature on the moisture detector. The cooperating alignment features allow the moisture detector to be attached to the moisture sensitive pad in the proper position to bring the corresponding connection points into electrical communication.

The moisture detector is selectively connectable to the sensing elements. When connected, the moisture detector detects the presence of electrolytic fluids (e.g., urine and other ionic solutions) in contact with the sensing elements. When the moisture detector determines that the moisture sensitive pad is wet, the moisture detector generates and transmits a trigger signal to the reward dispenser. The trigger signal tells the reward dispenser to dispense a reward. In various embodiments, the moisture detector interrogates an animal identification device worn by the animal to identify the animal using the moisture sensitive pad.

The reward dispenser dispenses one or more positive stimuli to the animal in response to a trigger signal. The reward dispenser includes a reservoir. The reservoir holds consumable rewards. In response to the trigger signal, the reward dispenser causes or allows a selected amount of the consumable reward to be transferred from the reservoir to a location accessible the animal.

To facilitate proper training, various embodiments of the housebreaking reward system utilize a delay timer. The delay timer introduces a delay after the elimination event is detected before rewarding the animal. Normally, detection of the fluid continues as long as fluid remains in contact with the sensing elements. The control logic of the moisture detector generates one trigger signal per elimination event. Preventing continuous generation of a trigger signal while the sensing elements remain wet conserves power. To further facilitate proper training, various embodiments of the housebreaking reward system optionally include a rearming timer. The rearming timer introduces a minimum time (i.e., rearming time) after the rewarding the animal before another reward may be dispensed. The rearming time discourages the animal from engaging in partial elimination events in order to receive frequent rewards.

BRIEF DESCRIPTION OF THE DRAWINGS

Further features, aspects, and advantages of the invention represented by the embodiments described present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

A housebreaking reward system is described herein and illustrated in the accompanying figures. The housebreaking reward system is used to train an animal to appropriately eliminate on a disposable pad. The moisture sensitive pad contains and holds fluids (e.g., urine) deposited by an animal. The moisture detector is selectively connectable to sensing elements on the moisture sensitive pad to detect when fluid is deposited. If fluid is detected, the moisture sensitive detector signals the reward dispenser to reward the animal for appropriate elimination. At least a portion the moisture sensitive pad is disposable to facilitate easy cleanup of the appropriate elimination area. After one or more fluid deposits, the moisture detector is disconnected from the sensing elements, and the used moisture sensitive pad is discarded. Although primarily used in reference to urination, the term "elimination" should be broadly construed to cover both urination and defecation.

Figure 1:
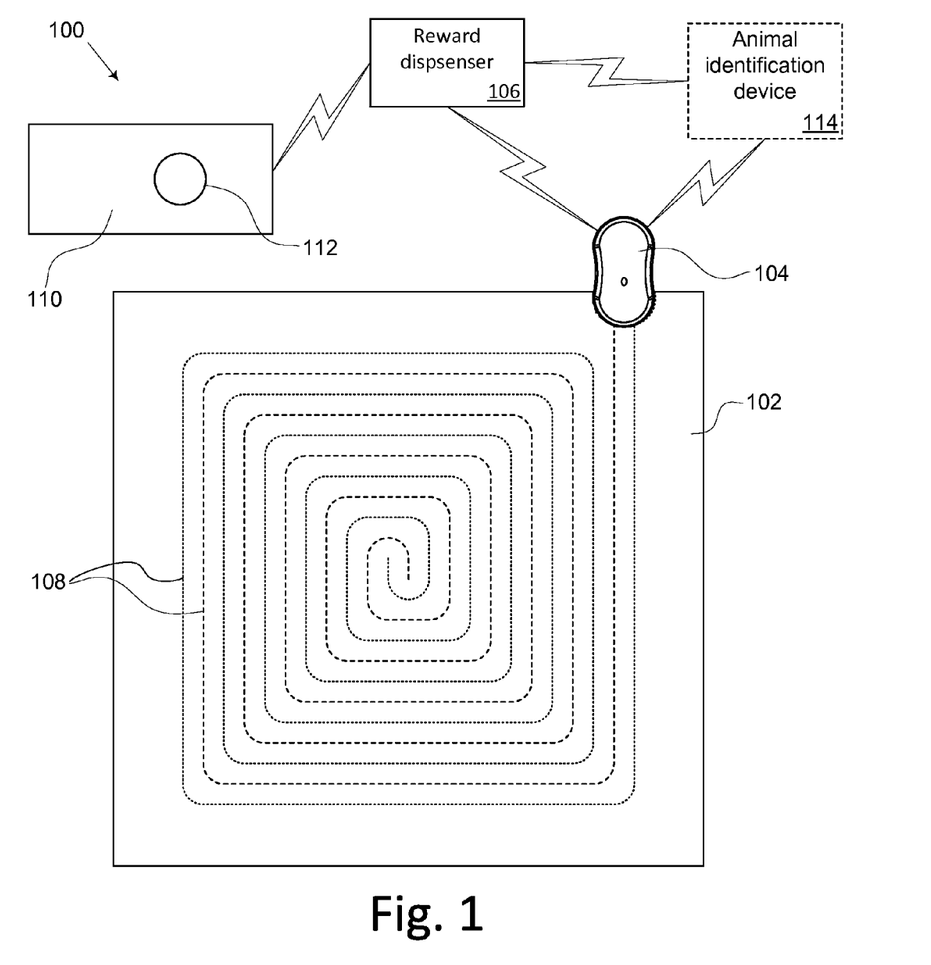
FIG. 1 is a block diagram of one embodiment of the housebreaking reward system.

FIG. 1 illustrates one embodiment of the housebreaking reward system. The housebreaking reward system 100 includes a moisture sensitive pad 102, a moisture detector 104, and a reward dispenser 106. The moisture sensitive pad 102 contains and holds fluids (e.g., urine) deposited by an animal. Sensing elements 108 work in conjunction with the moisture detector 104 to detect an elimination event such as when fluid is deposited on the moisture sensitive pad 102 (i.e., when the animal urinates). The moisture detector 104 is selectively connectable to the sensing elements 108 and is communicatively linked to the reward dispenser 106. If fluid is detected, the moisture detector 104 signals the reward dispenser 106 to reward the animal for appropriate elimination. After one or more elimination events, the moisture detector 104 is disconnected from the sensing elements 108, and the used moisture sensitive pad 102 is discarded. For use during training, the housebreaking reward system 100 optionally includes a handheld transmitter 110 having a switch 112 operable by a trainer (e.g., the pet owner). Like the moisture detector 104, the handheld transmitter 110 is communicatively linked to the reward dispenser 106 allowing the trainer to activate the reward dispenser and reward the animal. In various embodiments, the trigger signal generated by the handheld transmitter 110 is distinguishable from the trigger signal generated by the moisture detector 104. The moisture detector 104 and/or the reward dispenser optionally communicate with an animal identification device 114 to customize operation of the housebreaking reward system 100 to different animals.

Figure 2:
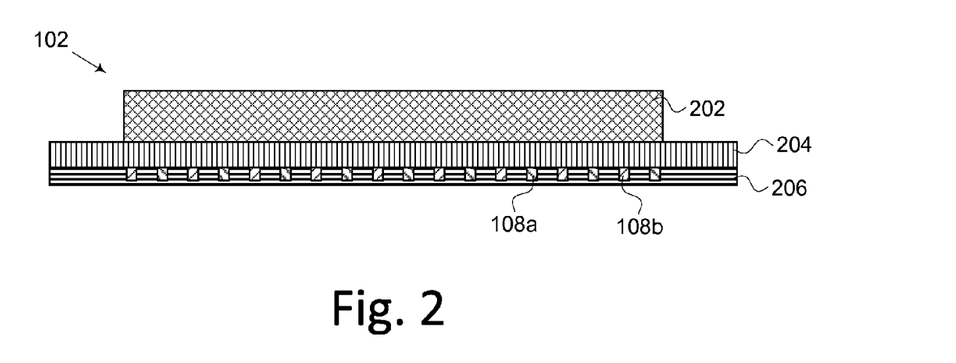
FIG. 2 is sectional view of one embodiment of the moisture sensitive pad.

FIG. 2 illustrates a sectional view of one embodiment of the moisture sensitive pad 102. The moisture sensitive pad 102 includes the sensing elements 108, a fluid holding layer 202, at least one optional wicking layer 204, and a backing layer 206. The sensing elements 108 work with the moisture detector 104 to detect fluids deposited on the moisture sensitive pad 102. The fluid holding layer 202 includes one or more sorbent media layers that collect and hold fluids, such as urine. The volume of fluid held by the fluid holding layer 202 is determined by various factors such as the number, construction, and materials of the sorbent media layers. In various embodiments, the fluid holding layer 202 is designed to hold urine from multiple elimination events before being discarded. The wicking layer 204 allows fluid to pass to the fluid holding layer 202 and substantially dries after a time to allow the sensing elements 108 to be responsive to multiple elimination events. The backing layer 206 is a fluid impermeable layer that prevents moisture in the fluid holding layer 202 from being transferred to the floor or other surface supporting the moisture sensitive pad 102. In some embodiments, the sensing elements 108 are applied to the backing layer. In other embodiments, the sensing elements 108 are applied to the wicking layer. In still other embodiments, the sensing elements 108 are carried in a separate sensing layer.

At least a portion of the moisture sensitive pad 102 is disposable. It is desirable, although not required, that the entire moisture sensitive pad 102 be disposable. At a minimum, the fluid holding layer 202 is disposable to facilitate easy cleanup of the appropriate elimination area. In various embodiments, the backing layer 206 is permanently secured to the underside of and disposable along with the fluid holding layer 202. In other embodiments, the backing layer 206 is a tray or other structure that rests beneath the fluid holding layer 202 and is reusable. In some embodiments, the sensor layer is integrated into or permanently secured to and disposable along with the fluid holding layer 202. In other embodiments, the sensor layer is a reusable structure that rests on top of or is selectively secured to the fluid holding layer 202.

The materials and/or the construction used in the sorbent media layers allow the sorbent media layers to absorb or adsorb fluids. Suitable materials for use in the sorbent media include, but are not limited to, natural organic sorbents (e.g., cotton), natural inorganic sorbents (e.g., clay), synthetic sorbents (e.g., polypropylene and other porous polymers), and combinations of thereof. Suitable constructions for the sorbent media include, but are not limited to, textiles (i.e., non-woven materials), fabrics (i.e., woven materials), fiber meshes, and open cell foams. In other embodiments, the sorbent media includes sorbents mixed with a carrier that allows the fluids to reach the sorbents. The carrier is generally a non-sorbent material or a sorbent material with a low sorption capacity relative to the primary sorbent material. Typically, the primary sorbent is non-flexible or otherwise not well suited as the sole material used in the construction of the sorbent media. In one specific example, the sorbent media includes silica gel beads or other sorbents that are surrounded by a porous membrane or held in a porous matrix fabricated from a polymer with a low sorption capacity.

The moisture sensitive pad 102 optionally carries additives that mask, reduce, neutralize, or eliminate odors from urine. The moisture sensitive pad 102 optionally carries additives with scents that attract animals but are generally imperceptible to humans. The moisture sensitive pad 102 optionally carries additives that change colors as the result of a reaction with the chemicals in the urine or when wet to provide a visual indication that the fluid holding layer 202 has been urinated upon and/or is currently wet. In various embodiments, some or all of the additives described above are carried by the fluid holding layer 202.

Figure 3:
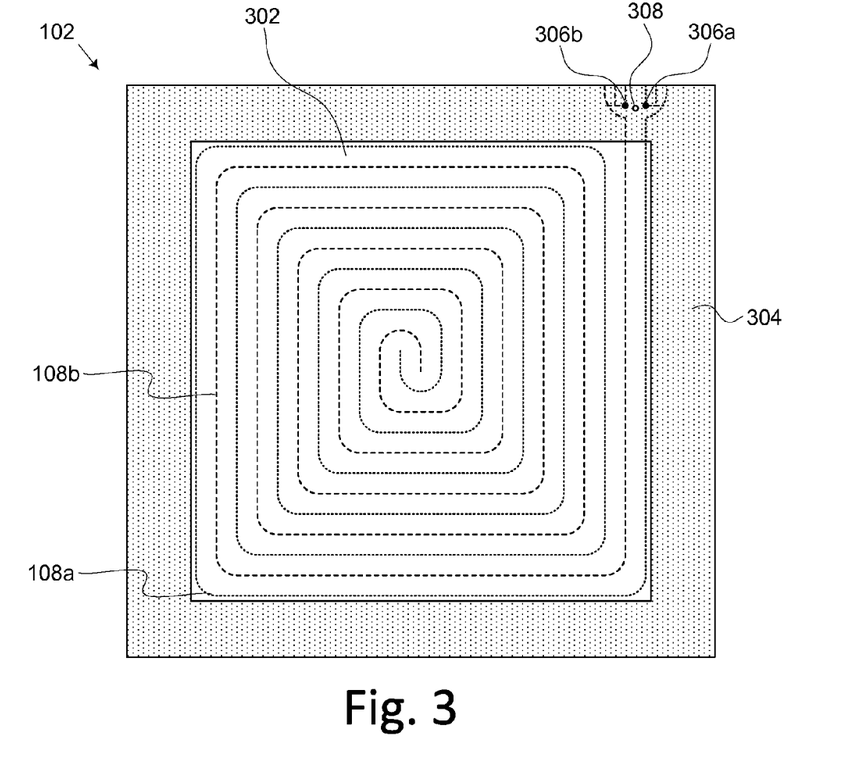
FIG. 3 illustrates one embodiment of the moisture sensitive pad.

FIG. 3 illustrates one embodiment of the moisture sensitive pad 102. To allow the detection of moisture, the sensing elements 108 include at least two separate conductors 108a, 108b designed to be placed in communication with the moisture detector 104. Examples of suitable conductor materials include, but are not limited to, electrically conductive threads, electrically conductive inks, electrically conductive polymer films, metal foils, and metal wires. The sensing elements 108 are applied or secured to the moisture sensitive pad 102 using an appropriate mechanical, thermal, or chemical bond, including, but not limited to, sewing (threads), printing (inks), adhesives, clips, and hook and loop fasteners. The relatively low cost of electrically conductive thread or ink compared to other conductors is beneficial, although not necessary, when the sensing elements 108 are included in the disposable portion of the moisture sensitive pad 102.

The sensing elements 108 are generally arranged in a covering pattern forming a normally open circuit over a central area 302 of the moisture sensitive pad 102. In various embodiments, the sensing elements 108 are arranged in a spiraling pattern that becomes tighter as the sensing elements 108 approach the center of the moisture sensitive pad 102. The spiral pattern serves as a "bull's eye" that is intended to draw the animal's attention and provide a visual target that is readily identifiable by the animal. Providing a visually identifiable target focused at the center of the moisture sensitive pad 102 helps to reduce instances of the animal fully or partially missing the moisture sensitive pad 102, which contributes to reduced training times and improved training success rates when compared to training pads 102 lacking the visual target.

In various embodiments, the moisture sensitive pad 102 includes a margin 304 that is not covered by the sensing elements 108. The margin 304 is a peripheral portion of the moisture sensitive pad 102. Fluid deposited in the margin 304 is not detected by the moisture detector 104 and does not result in the animal receiving a reward; however, fluid deposited in the margin 304 is still collected and held by the fluid holding layer 202 to minimize or eliminate any cleanup required beyond the disposal of the disposable portion of the moisture sensitive pad 102. The margin 304 may include various layers of the moisture sensitive pad 102. In various embodiments, the margin 304 includes the wicking layer 204 and the backing layer 206.

In various embodiments, the margin 304 is visually distinguishable from the central area 302 of the moisture sensitive pad 102. In some embodiments, the central area 302, the margin 304, and/or the sensing elements 108 have a color within the color spectrum visible to the animal to be visually identifiable by the animal. The color supplements and/or enhances the visual cues available to the animal during training and during post-training use of the housebreaking reward system. When the margin 304 is colored, the boundary surrounding the area of the moisture sensitive pad 102 where it is acceptable for the animal to eliminate is visually detectable by the animal. When the central area 302 is colored, the area of the moisture sensitive pad 102 where it is acceptable for the animal to urinate is visually detectable by the animal. In some embodiments, the visual distinction is due to the lack of the "bull's eye" spiral pattern in the margin 304.

Each of the sensing elements 108 terminates at a connection point 306a, 306b that electrically connects to a corresponding connection point on the moisture detector 104. The moisture sensitive pad 102 has an alignment feature 308 that registers with a cooperating alignment feature on the moisture detector 104. The cooperating alignment features allow the moisture detector 104 to be attached to the moisture sensitive pad 102 in the proper position to bring the corresponding connection points into electrical communication. In various embodiments, the alignment feature 308 of the moisture sensitive pad 102 is a through opening. In some embodiments, the perimeter of the alignment opening is reinforced to reduce the likelihood of tearing. In some embodiments, the backing layer 206 provides the reinforcement of the alignment opening. In other embodiments, the alignment feature 308 is a reference mark used as visual guide the proper placement of the moisture detector 104.

When connected, the moisture detector 104 detects the presence of electrolytic fluids (e.g., urine and other ionic solutions) in contact with the sensing elements 108. More specifically, the moisture detector 104 is placed in electrical communication with each of the sensing elements 108. The sensing elements 108 are electrically isolated from each other due to the physical separation between them. When the moisture sensitive pad 102 is dry, the sensing elements 108 form an open circuit. When an electrolytic fluid is deposited on the moisture sensitive pad 102 in a sufficient quantity, the electrically conductive fluid electrically connects (i.e., shorts) the sensing elements 108.

Figure 4A:
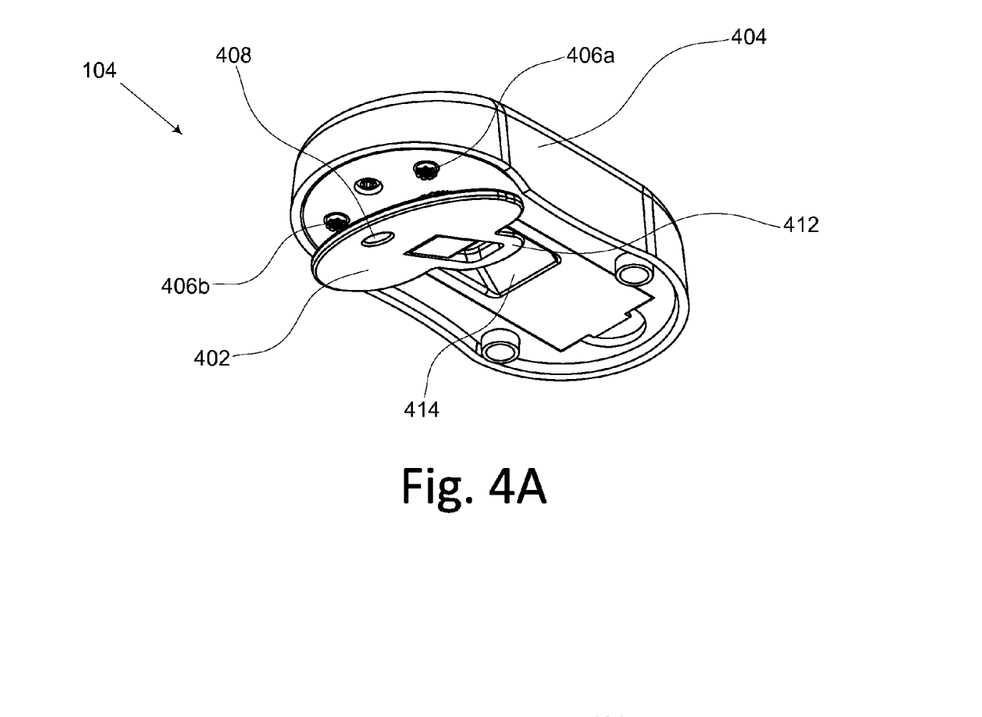
FIG. 4A is a bottom perspective view is one embodiment of the moisture detector.
Figure 4B:
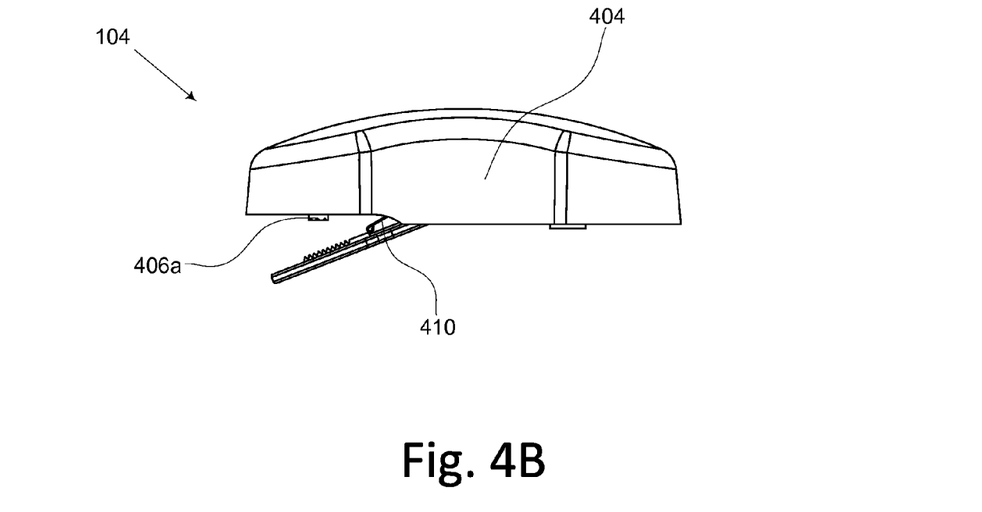
FIG. 4B is a side elevation view of one embodiment of the moisture detector.

FIGS. 4A and 4B illustrate one embodiment of the moisture detector 104. The moisture detector 104 is selectively connectable to the sensor layer. The connection between the moisture detector 104 and the moisture sensitive pad 102 is typically electromechanical. In the illustrated embodiment, the moisture detector 104 is selectively clipped to the moisture sensitive pad 102. The moisture detector 104 includes a movable clamp plate 402 that securely engages the main body 404 of the moisture detector 104. Opening the clamp plate 402 reveals two electrodes 406a, 406b and an alignment feature 408. The alignment feature 408 and the electrodes 406a, 406b are relatively positioned such that when the alignment features 308, 408 of the moisture sensitive pad 102 and the moisture detector 104 are properly registered and the clip secured, the corresponding connection points 306a, 306b, 406a, 406b of the moisture sensitive pad 102 and the moisture detector 104 are placed in electrical communication.

In the illustrated embodiment, the alignment feature 408 is an opening that provides a viewport to visually determine when the moisture detector 104 is properly aligned with the moisture sensitive mat 102. In various embodiments, the clamp plate 402 is biased toward engagement with the main body 404 of the moisture detector 104 by an appropriate biasing element 410, such as a spring. In some embodiments, the force applied by the spring is sufficient to hold the moisture detector 104 in place when closed. In the illustrated embodiment, the clamp plate 402 includes a lever arm 412 that is depressed to easily open the clip and recess 414 in the main body 404 that provides room to receive the lever arm 412. In some embodiments, the clamp plate 402 and/or the electrodes 406a, 406b teeth or other gripping structures that increase the friction between the moisture detector 104 and the moisture sensitive pad 102.

In other embodiments, the alignment feature 408 of the clip includes a projection and a corresponding recess. The diameter of the projection is slightly smaller than the diameter of the corresponding recess forming a compression fitting when the clip is closed. When the moisture sensitive pad 102 includes an alignment opening, the projection is passed through the opening. Otherwise, the projection is aligned with the alignment indicia and the moisture sensitive pad 102 is compressed between the projection and the recess. In some embodiments, the projection and the recess are dimensioned such that the thickness of the moisture sensitive pad 102 fills the gap between the projection and the recess is attached to the moisture sensitive pad 102 to achieve the compression fitting.

Figure 5:
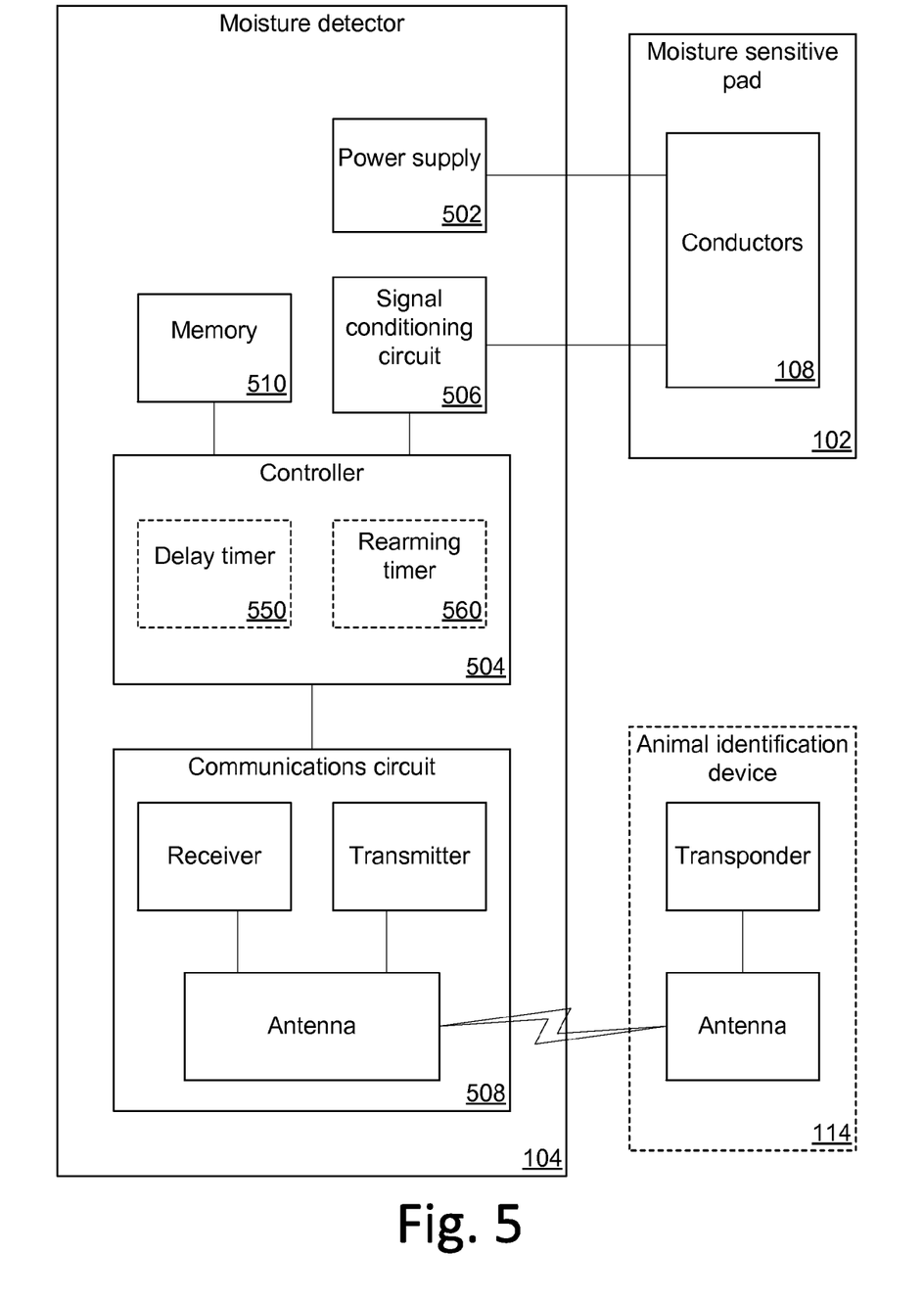
FIG. 5 is a block diagram of one embodiment of the moisture detector.

FIG. 5 is a block diagram of one embodiment of the moisture detector 104. The moisture detector 104 includes a power supply 502 that supplies power to the sensing elements 108. In general, each sensing element is connected to a different circuit node having different potentials. In various embodiments, one sensing element is in electrical communication with the supply voltage of the power supply, and the other sensing element is in electrical communication with the circuit ground or another circuit node not held at the supply voltage. The sensing elements 108 are also connected to the inputs of a controller 504 that responds to changes in the signal on the sensing elements 108. Optional signal conditioning circuitry 506 filters, conditions, samples, or otherwise modifies the signal from the sensing elements 108 to make the signals compatible with the inputs, to buffer the inputs, or to enhance selected characteristics of the signal.

A controller 504 handles processing and generally controls the operation of the moisture detector 104. In various embodiments, the moisture detector 104 measures or derives a value of at least one electrical property of the signal and/or the conductive medium (i.e., the sensing elements 108 and the wet/dry pad 102) that is influenced by the presence or absence of an electrolytic fluid. Examples of signal characteristics that are measurable or derivable by the moisture detector 104 include, but are not limited to, voltage, current, resistivity, conductivity, and capacitance. In a specific example, the moisture detector 104 measures the voltage between the separate sensing elements 108.

In some embodiments, the moisture detector 104 determines whether the moisture sensitive pad 102 is wet or dry based on a change in the electrical property value. For example, the moisture detector 104 distinguishes between a starting (i.e., default) property value corresponding to a dry pad 102 and a property value that differs from the starting value when the moisture sensitive pad 102 is wet. In a specific example, the moisture detector 104 distinguishes between a voltage with a magnitude of approximately zero (i.e., a dry pad 102) and a voltage with a magnitude that is not approximately zero (i.e., a wet pad 102).

In other embodiments, the moisture detector 104 determines whether the moisture sensitive pad 102 is wet or dry based on a comparison of the electrical property value to a reference (i.e., threshold) value. For example, a property value that is below a threshold corresponds to a dry pad 102 and a property value above the threshold corresponds to a wet pad 102 (or vice versa). In a specific example, when the voltage between the sensing elements 108 is below a selected reference voltage, the moisture sensitive pad 102 is deemed dry. When the voltage between the sensing elements 108 is equal to or exceeds the selected reference voltage, the moisture sensitive pad 102 is deemed wet.

In some embodiments, the electrical property varies in magnitude based on the conductivity of the electrolytic fluid allowing the moisture detector 104 to perform additional analysis of the electrical properties to obtain and/or derive additional information about and draw inferences about the electrolytic fluid. For example, the moisture detector 104 looks at the value of the electrical property to determine whether the electrolytic fluid is urine or some other fluid. In a specific example, some embodiments of the signal conditioning circuitry 506 include sampling components such as, but not limited to, an analog-to-digital converter, to allow measured electrical property to be converted to a discrete value for processing. The voltage between the separate sensing elements 108 is sampled and digitized. The digitized value is compared to one or more reference values to determine if the property is within the range of values normally associated with a selected electrolytic fluid. In some embodiments, if the property value lies outside the range, the wet/dry determination is discarded. In other embodiments, the wet/dry determination is discounted, discarded, or overridden based on the amount of deviation of the actual value from the reference value. In some embodiments, the results of the analysis of multiple properties are used in categorizing the electrolytic fluid.

The moisture detector 104 is in communication with the reward dispenser through a communication circuit 508. When the moisture detector 104 determines that the fluid holding layer 202 is wet, the moisture detector 104 generates and transmits a trigger signal to the reward dispenser 202. The trigger signal tells the reward dispenser to dispense a reward. The communications circuit includes a transmission component and/or a reception component as required. The transmission component includes a transmitter that modulates the trigger signal and an associated antenna that converts the modulated signal into a radio frequency signal. The reception component includes an antenna for converting a radio frequency trigger signal into currents that are filtered and/or demodulated by a receiver.

In various embodiments, the moisture detector 104 interrogates the animal identification device 112 worn by the animal to identify the animal using the moisture sensitive pad 102. Examples of suitable animal identification devices include, but are not limited to, a transponder or transceiver carried by a collar, a harness, ear tag, or other article worn by or attached to the animal and a microchip implanted in the animal. When the moisture detector 104 determines that the fluid holding layer 202 is wet, the moisture detector 104 attempts to obtain the identity information associated with the animal identification device. The controller 504 optionally collects additional information such as the time and/or date of the elimination event. In various embodiments, the identity information and any optional additional information is used for record keeping (i.e., logging) purposes. In some embodiments, the identity information and any optional additional information allows the issuance, frequency, amount, or type of reward to be customized to specific animals. For example, the identity information can be used to identify an animal undergoing initial training and deliver a reward each time that animal uses the moisture sensitive pad 102 while an established animal might receive a reward on a less frequent basis. The moisture detector 104 optionally includes a memory 510 for storage of the identity information and any optional additional information.

In various embodiments, the identity information and any optional additional information (or information derived from it) is transmitted in or with the trigger signal for optional storage and/or use at the reward dispenser 202. In other embodiments, the identity information and any optional additional information is stored and/or used by the moisture detector 104. When used at the moisture detector 104, the identity information and any optional additional information may be used to determine whether to generate a trigger signal. Such usage facilitates power saving by reducing unnecessary transmissions. For example, no identity information would be available and a trigger signal would not be sent for occurrences such as a drink being spilled on the moisture sensitive pad 102. Similarly, when the rewards are limited to or customized for specific animals, a trigger signal would be sent only when the appropriate condition is met. For example, multiple animals might have access to the moisture sensitive pad 102, but only one is authorized to receive a reward. In such a case, a trigger signal would only be sent if the identity information matches an authorized identifier stored in the moisture detector 104. If not used or understood, the reward dispenser ignores the part of the message containing the identity information and any optional additional information.

Figure 6:
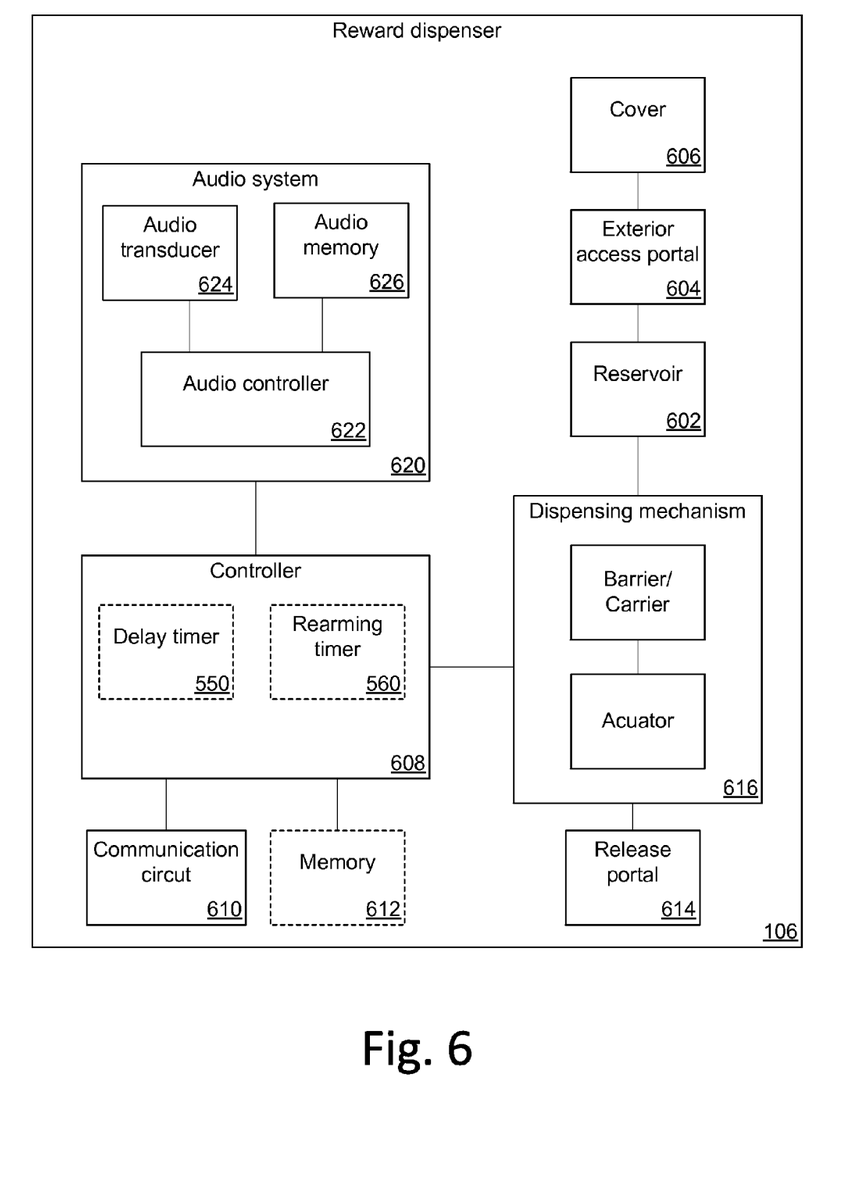
FIG. 6 is block diagram of one embodiment of the reward dispenser.

FIG. 6 is a block diagram of one embodiment of the reward dispenser 106. The reward dispenser 106 dispenses one or more positive stimuli to the animal in response to a trigger signal. The reward dispenser 106 includes a reservoir 602. The reservoir 602 holds consumable rewards, including but not limited to, consumable solid treats, consumable liquid treats, and kibble. An exterior access portal 604 provides access to the reservoir 602. In various embodiments, a cover 606 (e.g., a lid, door/panel, or stopper) is displaced or removed from the exterior access portal to allow the reservoir 602 to be filled and is replaced or reattached to prevent direct access to the contents of the reservoir 602. The cover 606 may also seal the reservoir 602 to prevent spillage and/or spoilage of the contents. In some embodiments, the cover 606 is selectively securable in a manner that cannot be manipulated by the animal (e.g., a latch, threads, or a tight frictional fit) to prevent the animal from opening the reservoir 602 and gaining direct access to the contents. In various embodiments, the reservoir 602 is removable for cleaning or filling.

The reward dispenser 106 also includes a controller 608 to handle processing and generally control operation of the reward dispenser 106. A communication circuit 610, as described above, allows the reward dispenser 106 to communicate with the moisture detector 104, the handheld transmitter 110, and, optionally, the animal identification device 114. Initially, the communication circuit receives the trigger signal. The trigger signal is processed by a controller 608 to extract any encoded information. The information encoded in the trigger signal includes some or all of the information including, but not limited to, an identification of the transmitter 110, an identification of the animal using the moisture sensitive pad 102, and the date and/or time that the moisture sensitive pad 102 was used (or the trigger signal was generated). In some embodiments, the controller 608 records the information encoded in the trigger signal in a log stored in an optional memory 612. The logged information may later be retrieved by the trainer. In some cases, information such as the date and/or time is provided by the reward dispenser 106 upon receipt of the trigger rather than being sent from the moisture detector 104.

In some embodiments, the controller 608 uses some or all of the information encoded in the trigger signal for controlling access to the consumable reward to the animal using the moisture sensitive pad 102. In such cases, the reward dispenser 106 may utilize the communication circuit 610 to send an identification request to the animal identification device worn by the animal approaching the reward dispenser 106. The identity information received from the animal identification device is passed to the controller 608 where it is compared to the identity information encoded in the trigger signal. The reward dispenser 106 dispenses the reward when the two identities match to ensure that only the animal that used the moisture sensitive pad 102 is rewarded. In some embodiments, the controller 608 uses some or all of the information encoded in the trigger signal for customizing the reward to the animal that used the moisture sensitive pad 102.

In response to the trigger signal, the controller 608 causes or allows a selected amount of the consumable reward to be transferred from the reservoir 602 through a release portal 614 to a location accessible the animal through a dispensing mechanism 616. Some embodiments of the reward dispenser 106 use a carrier to push, pull, lift, carry, or otherwise cause delivery of the consumable reward to a location accessible by the animal. Examples of suitable carriers include, but are not limited to, carousels, belts, carts, rakes, scoops, screws, fans, pumps, and vibration generators. The carrier is operatively connected to an actuator, such as a motor by an appropriate transmission or linkage. An example of a suitable vibration generator includes, but is not limited to, a motor driving an eccentric cam. Some embodiments of the reward dispenser 106 use a selectively movable (i.e., displaceable) barrier to control delivery of the consumable reward to a location accessible by the animal. Examples of suitable barriers include, but are not limited to, doors and flaps that may be actively (e.g., by an actuator) or passively (e.g., pushed open by the consumable reward) opened.

A selected amount of the consumable reward dispensed by the reward dispenser 106 is controlled through mechanical or temporal control. In an example of a temporal control, the reward dispenser 106 includes a timer (e.g., provided by the reward dispenser 106 controller) that controls the amount of time that a door remains open or the carrier is driven, which, in turn, determines the amount of the consumable reward that is dispensed. In an example of a mechanical control, the carrier is an auger, a paddle wheel, or a similar indexed or compartmentalized structure that limits the amount of the consumable reward moved by each dispensing operation. When the carrier is triggered, the mechanical control undergoes a partial revolution. Each partial revolution brings one of the compartments of the mechanical control into alignment with a dispensing portal allowing the contents of the compartment to be dispensed. As the mechanical control continues to rotate, empty compartments are refilled allowing the reward dispenser 106 to operate in a continuous manner.

In various embodiments, the reward dispenser 106 uses a combination of carriers and barriers to control the delivery of the consumable reward. Depending upon the configuration of the delivery path of the reward dispenser, multiple individual pieces of the consumable reward attempting to surge along the delivery path at the same time may tend to block each other. A controller 608 activates a vibration generator for a selected amount of time to break the static equilibrium and cause pieces of the consumable reward to move to the release portal 614. The release portal 614 is normally closed by a barrier (e.g., a trap door). The barrier prevents incidental contact or other occurrences from causing the consumable reward to be released unless a trigger signal has been received. Next, the controller 608 opens the barrier or allows the barrier to open (e.g., releasing a lock or stop or displacing the barrier) to transfer pieces of the consumable reward to a location accessible by the animal.

As previously discussed, the moisture detector 104 is responsive to fluid in or contacting the sensing elements 108. Detection occurs at or near the start of the elimination event. To facilitate proper training, various embodiments of the housebreaking reward system utilize a delay timer 550. The delay timer 550 introduces a delay after the elimination event is detected before rewarding the animal. The delay gives the animal time to fully empty its bladder before receiving a reward and discourages partial elimination events. Without such a delay, the animal may be encouraged to stop before fully relieving itself as soon as the reward is dispensed. One example of a suitable delay, without limitation, is approximately 10 seconds. In some embodiments, the delay timer 550 is part of the controller 504 of the moisture detector 104 and delays the transmission of the trigger signal. In other embodiments, the delay timer 550 is part of the controller 608 of the reward dispenser 106 and delays the response to the trigger signal.

In some instances, detection of the fluid continues as long as fluid remains in contact with the sensing element 108. The control logic of the moisture detector 104 generates one trigger signal per elimination event. Preventing continuous generation of a trigger signal while the fluid remains in contact with the sensing elements 108 conserves power. In some embodiments, the wicking layer 204 works to move fluids to the fluid holding layer 202 and the trigger signal is generated when fluid no longer contacts the sensing elements 108. Other embodiments of the moisture detector 104 send the trigger signal when fluid is initially detected and then prevent generation of any additional trigger signals until fluid is no longer detected. Rapidly moving fluid away from the sensing elements 108 facilitates use of the housebreaking reward system in a multiple animal scenario.

To facilitate proper training, various embodiments of the housebreaking reward system the housebreaking reward system optionally include a rearming timer 560. The rearming timer introduces a minimum time (i.e., rearming time) after the rewarding the animal before another reward may be dispensed. The rearming time discourages the animal from engaging in partial elimination events in order to receive frequent rewards. In various embodiments, the timer is part of the controller 504 of the moisture detector 104 and delays the transmission of the trigger signal. In other embodiments, the rearming timer 560 is part of the controller 608 of the reward dispenser 106 and delays the response to the trigger signal. One example of a suitable rearming time, without limitation, is approximately 20 minutes. In some embodiments, the time required to move the fluid away from the sensing elements establishes the minimum time between detectable elimination events. Control over this minimum time is accomplished, at least in part, by the material selection of the wicking layer and/or the fluid holding layer. The housebreaking reward system may also track separate rearming times for individual animals based on the animal identification information. Tracking separate rearming times for individual animals facilitates use of the housebreaking reward system in a multiple animal scenario.

In various embodiments, the reward dispenser 106 includes an audio system 620. In some embodiments, the sounds produced by the audio system 620 are used to provide an audible positive reinforcement to the animal. In some embodiments, the audio system audibly notifies the animal that a consumable reward is available. In some embodiments, the audio system is used to deliver both the audible positive reinforcement and the consumable reward availability notification. By providing both an audible positive reinforcement and a consumable reward, the housebreaking reward system provides redundant positive reinforcement. In the event that the reward dispenser 106 is empty or fails to deliver the treat, the animal should still receive the audible positive reinforcement. Similarly, in the event that the audible positive reinforcement fails to play, the animal should still receive the treat.

The audio system 620 includes an audio controller 622 in communication with an audio transducer 624. The audio transducer 624 converts the audio signals into sounds in the frequency ranges audible to the animal. The audio system optionally includes a memory 626 for storing custom audio data, such as a recording of the owner's voice delivering praise, the owner's voice calling the animal to receive a treat, or a particular song or sound to which the animal naturally responds or to which the animal has been trained to respond. In various embodiments, the audio system optionally includes a microphone to allow the custom audio data to be recorded. In some embodiments, the audio system imports the custom audio data from an external source.

During training, the handheld transmitter 110 is used to establish a positive association between the moisture sensitive pad 102 and rewards for elimination. In the beginning, training begins by placing or coaxing the animal onto the moisture sensitive pad 102, saying a code word or phrase that will be associated with elimination events (e.g., "potty time"), and manually (i.e., by hand) giving the animal a consumable reward. Once the animal is familiar with the look and feel (and location) of the moisture sensitive pad 102, the next step in training is to continue placing or coaxing the animal onto the moisture sensitive pad 102 and wait for the animal to eliminate. After a short delay from when the animal eliminates, a consumable reward is dispensed from the reward dispenser 106 using the handheld transmitter 110. Additional training should not occur for a considerable time (i.e., the rearming time) after an elimination event. Once the animal consistently eliminates on the moisture sensitive pad 102 under supervision, the housebreaking reward system is used to provide automatic and unsupervised reinforcement by attaching the moisture detector 104 to the moisture sensitive pad 102.

The communication circuits are described herein as using radio frequency communication circuits; however, those skilled in the art will recognize that other types of communication circuits (e.g., infrared or ultrasonic) may be used without departing from the scope and spirit of the present invention. The communication circuits may also be designed to utilize wired communications.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:
1. A housebreaking reward system comprising:
  a disposable pad comprising:
    a fluid holding layer arranged on the top of the disposable pad, the fluid holding layer comprising sorbent media to hold fluid deposited on the disposable pad;
    sensing elements responsive to contact with the fluid;
    a wicking layer arranged between the fluid holding layer and the sensing elements, the wicking layer comprising a wicking material arranged to wick fluid from the sensing elements to the fluid holding layer such that the fluid is held in the fluid holding layer and the sensing elements are non-responsive; and a backing layer beneath the wicking layer, the backing layer preventing fluid from transferring to a surface supporting the disposable pad;

a moisture detector sending a trigger signal when at least one sensing element responds to the fluid deposited on the disposable pad; and a reward dispenser comprising:
 a reservoir for holding a consumable reward; and
 a dispenser dispensing at least a portion of the consumable reward from the reservoir in response to the trigger signal.

2. The housebreaking reward system of claim 1 characterized in that the sensing elements comprise a first electrical conductor and a second electrical conductor arranged to cover a central area of the disposable pad, the first electrical conductor separated from the second electrical conductor.

3. The housebreaking reward system of claim 2 characterized in that each of the first electrical conductor and the second electrical conductor are an electrically conductive ink printed on the backing layer.

4. The housebreaking reward system of claim 1 characterized in that the sensing elements are applied to one of the wicking layer and the backing layer using one of an electrically conductive ink and an electrically conductive thread.

5. The housebreaking reward system of claim 1 characterized in that the moisture detector further comprises a delay timer measuring a selected amount of time after the at least one sensing element responds to the fluid deposited on the disposable pad.

6. The housebreaking reward system of claim 1 characterized in that the moisture detector further comprises a rearming timer measuring a selected amount of time after sending a first trigger signal before sending a second trigger signal.

7. The housebreaking reward system of claim 1 characterized in that the reward dispenser further comprises a rearming timer measuring a selected amount of time before a second consumable reward may be dispensed after a first consumable reward is dispensed.

8. The housebreaking reward system of claim 1 characterized in that the reward dispenser further comprises a rearming timer measuring a selected amount of time after receiving a first trigger signal from the moisture detector before responding to a second trigger signal from the moisture detector.

9. The housebreaking reward system of claim 1 further comprising a handheld transmitter in communication with the reward dispenser, the handheld transmitter generating a trigger signal that is distinguishable from the moisture detector trigger signal.

10. A housebreaking reward system comprising:
 a disposable pad comprising:
  a fluid holding layer comprising sorbent media to hold fluid deposited on the disposable pad;
  a sensor layer including at least two sensing elements, the at least two sensing elements comprising conductors forming a normally open circuit when dry, and the at least two sensing elements being responsive to contact with the fluid;
  a wicking layer comprising a wicking material arranged between the fluid holding layer and the sensing elements, the wicking layer being in fluid communication with the fluid holding layer and the sensor layer such that the wicking layer wicks the fluid away from the sensing elements and to the fluid holding layer; and
  a fluid impermeable layer beneath the fluid holding layer, the fluid impermeable layer preventing fluid from transferring to a surface supporting the disposable pad;
 a moisture detector in electrical communication with the conductors, the moisture detector sending a first trigger signal when an electrolytic fluid deposited on the disposable pad creates an electrical connection between the conductors;
 a handheld transmitter sending a second trigger signal when a switch is actuated; and
 a reward dispenser delivering a consumable reward to the animal in response to one of the first trigger signal and the second trigger signal.

11. The housebreaking reward system of claim 10 characterized in that the reward dispenser further comprises an audio transducer producing a positive audible reinforcement in response to the trigger signal.

12. A housebreaking reward system comprising:
 a disposable pad including:
  a fluid holding layer arranged on the top of the disposable pad, the fluid holding layer comprising sorbent media to hold fluid deposited on the disposable pad;
  sensing elements responsive to contact with the fluid deposited on the disposable pad; and
  a wicking layer arranged between the fluid holding layer and the sensing elements, the wicking layer comprising a selected wicking material to wick fluid from the sensing elements to the fluid holding layer such that the fluid is held in the fluid holding layer and the wicking layer is substantially dry such that the sensing elements are responsive to a subsequent contact with a subsequent fluid; and
 a moisture detector sending a trigger signal when at least one sensing element responds to the fluid deposited on the disposable pad; and
 a reward dispenser including:
  a reservoir to hold consumable rewards; and
  a dispenser to dispense at least a portion of the consumable reward from the reservoir in response to the trigger signal.

13. The housebreaking reward system of claim 12 characterized in that the sensing elements comprise a first electrical conductor and a second electrical conductor arranged to cover a central area of the disposable pad, the first electrical conductor separated from the second electrical conductor.

14. The housebreaking reward system of claim 13 characterized in that each of the first electrical conductor and a second electrical conductor is an electrically conductive ink.

15. The housebreaking reward system of claim 12 characterized in that the moisture detector further comprises a delay timer measuring a selected amount of time after the at least one sensing element responds to the fluid deposited on the disposable pad.

16. The housebreaking reward system of claim 12 characterized in that the moisture detector further comprises a rearming timer measuring a selected amount of time after sending a first trigger signal before sending a second trigger signal.

17. The housebreaking reward system of claim 12 characterized in that the reward dispenser further comprises a rearming timer measuring a selected amount of time before a second consumable reward may be dispensed after a first consumable reward is dispensed.

18. The housebreaking reward system of claim 12 characterized in that the reward dispenser further comprises a rearming timer measuring a selected amount of time after receiving a first trigger signal from the moisture detector before responding to a second trigger signal from the moisture detector.

19. The housebreaking reward system of claim 12 characterized in that the selected wicking material and sorbent material are selected based on the time required to move the fluid away from the sensing elements such that the subsequent fluid is detectable.

* * * * *